United States Patent
Ito et al.

(10) Patent No.: US 11,494,448 B2
(45) Date of Patent: Nov. 8, 2022

(54) DATABASE SERVER DEVICE, SERVER SYSTEM AND REQUEST PROCESSING METHOD

(71) Applicant: HITACHI, LTD., Tokyo (JP)

(72) Inventors: Takeshi Ito, Tokyo (JP); Kenji Fujihira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 357 days.

(21) Appl. No.: 16/817,827

(22) Filed: Mar. 13, 2020

(65) Prior Publication Data

US 2021/0042375 A1 Feb. 11, 2021

(30) Foreign Application Priority Data

Aug. 9, 2019 (JP) .............................. JP2019-147655

(51) Int. Cl.
*G06F 16/9532* (2019.01)
*G06F 9/54* (2006.01)
*H04L 67/01* (2022.01)

(52) U.S. Cl.
CPC .......... *G06F 16/9532* (2019.01); *G06F 9/547* (2013.01); *H04L 67/01* (2022.05)

(58) Field of Classification Search
CPC ............................. G06F 16/9532; G06F 9/547
See application file for complete search history.

(56) References Cited

U.S. PATENT DOCUMENTS

| | | | |
|---|---|---|---|
| 5,721,904 A | 2/1998 | Ito et al. | |
| 6,243,710 B1 * | 6/2001 | DeMichiel | .......... G06F 16/2315 707/797 |
| 2006/0277157 A1 * | 12/2006 | Seidl | ................ G06F 16/24575 707/999.002 |

FOREIGN PATENT DOCUMENTS

| | | |
|---|---|---|
| CN | 108 228 597 A | 6/2018 |
| JP | 2001522086 A | 11/2001 |

OTHER PUBLICATIONS

European Extended Search Report dated Jul. 14, 2020, issued in EP counterpart application No. 20163139.7.

* cited by examiner

*Primary Examiner* — Kannan Shanmugasundaram
(74) *Attorney, Agent, or Firm* — Mattingly & Malur, PC

(57) ABSTRACT

The lock time of a database upon the execution of a series of processes is decreased, and the load of the implementation/modification of the database server device upon changing the application destination of the Web system is reduced. A database server provides a prescribed simple API, and comprises a request processing unit, an SQL creation unit, and an SQL processing unit. In the database server device 120, when a plurality of divided requests are received from the Web server device as the request for requesting a series of processing, the SQL processing unit executes SQL integration processing of temporarily storing the generated SQL sentences until generation of the SQL sentences is ended for all of the plurality of divided requests, and integrating and editing the plurality of temporarily stored SQL sentences and creating the whole SQL sentence after generation of the SQL sentence is ended for all of the requests.

12 Claims, 9 Drawing Sheets

FIG.4

```
SELECT
   A AS API_A_PARAM_A,
   B AS API_A_PARAM_B,
   C AS API_A_PARAM_C,
   D AS API_A_PARAM_D
WHERE
   A = 1
```
210

⇩ GENERATE

```
{
  "data": {
     "A": 1,
     "B": 2,
     "C": 3,
     "D": 4
  },
  "param": {
     "A": "API_A_PARAM_A",
     "B": "API_A_PARAM_B",
     "C": "API_A_PARAM_C",
     "D": "API_A_PARAM_D"
  }
}
```
220

FIG.7

| ColumnA | ColumnB | ... | ColumnX | |
|---|---|---|---|---|
| ColumnA | ColumnB | ... | ColumnX | ~231 |
| 1 | Value1-B | ... | Value1-X | ~232 |
| ... | ... | ... | ... | |
| N | ValueN-B | ... | ValueN-X | |

EXECUTED SQL SENTENCE (AFTER SIMPLE CONCATENATION) ~280

```
SELECT
ColumnA AS GETAPI_COLA,  ColumnB AS GETAPI_COLB, ...
ColumnX AS GETAPI_COLX
FROM TABLE701
WHERE
ColumnA = 1

SELECT * FROM TABLE701
WITH (TABLOCKX)

UPDATE TABLE701 SET
    ColumnB = param(GETAPI_COLB) + 1, ..., ColumnX = param(GETAPI_COLX) * 2
WHERE ColumnA = 2
COMMIT
```

INTEGRATE 

EXECUTED SQL SENTENCE (AFTER INTEGRATION) ~290

```
SELECT * FROM TABLE701
WITH (TABLOCKX)

UPDATE TABLE701 SET
    ColumnB = (SELECT ColumnB AS GETAPI_COLB FROM TABLE701
              WHERE ColumnA = 1) + 1,
    ...,
    ColumnX = (SELECT ColumnX AS GETAPI_COLX FROM TABLE701
              WHERE ColumnA = 1) * 2
WHERE ColumnA = @VALUE_A
COMMIT
```

DATABASE SERVER DEVICE, SERVER SYSTEM AND REQUEST PROCESSING METHOD

CROSS-REFERENCE TO RELATED APPLICATION

The present application claims priority from Japanese application JP 2019-147655, filed on Aug. 9, 2019, the contents of which is hereby incorporated by reference into this application.

TECHNICAL FIELD

The present invention relates to a database server device, a server system and a request processing method, and can be suitably applied to a database server device, a server system and a request processing method for processing a request of data processing to a database in a Web system.

BACKGROUND ART

Conventionally, a general Web system is configured so that a Web server device is directly connected to a database management system (DBMS: DataBase Management System), and data processing is requested by the Web server device sending an SQL sentence to the DBMS. While a DBMS is being provided by various vendors, the mode of expression and data type of the SQL differ depending on the DBMS. Thus, with a conventional general Web system, there was a problem in that it was not easy to switch a Web system, which was created for a certain DBMS, so that it will be compliant with another DBMS.

Here, as a Web system that can be easily compatible with a DBMS prepared by a user, known is a configuration of providing a database (DB) server device between the Web server device and the DBMS. With a Web system comprising a DB server device, the Web server device uses an HTTP (Hypertext Transfer Protocol) and requests the DB server device to execute the operational processing of data to the DBMS, and, by the DB server device configured from an HTTP server generating an SQL sentence corresponding to the DBMS and by requesting data processing to the DBMS, the DB server device can request processing to the DBMS without having to worry about the configuration of the DBMS.

CITATION LIST

Patent Literature

[PTL 1] Japanese Translation of PCT International Application Publication No. 2001-522086

SUMMARY OF THE INVENTION

Problems to be Solved by the Invention

Meanwhile, when building a platform based on a Web system, in addition to the foregoing requirement of being easily compatible with a DBMS, the Web system is expected to be applicable to different application destinations (cases) mainly based on the modification of the Web system. In the foregoing case, because the data items of the database and the data processing performed to the DBMS will differ depending on the application destination, the Web client and the Web system need to be modified according to the contents of the application destination. For example, while a DB server device provides an API (Application Programming Interface) to the Web server device, because one API is normally provided for a series of processing of the DBMS, it tends to become an API that is unique to the current case. In other words, in order to deal with a case based on a different Web system, it becomes necessary to modify the API provided by the DB server device, and this increases the burden on the DB server device in making the foregoing modification. Consequently, if the load of the implementation/modification increases according to the contents of the case of the application destination, there is a problem in that it is not possible to immediately deal with that case.

Here, for example, PTL 1 discloses a method of making the processing of lock, commit or rollback executable across the series of processing by requesting the execution of the series of processing by combining the divided APIs and sending a URL (Uniform Resource Locator) designated by the DB server device at the start of a transaction or upon performing commit processing. By using the method disclosed in PTL 1, because a series of processing can be divided into a plurality of APIs rather than being represented with one API, when a Web system is to be applied to a different application destination, the effect of reducing the burden on the DB server device in making modifications can be expected. Nevertheless, with the method disclosed in PTL 1, when a series of processing is to be executed to the DBMS based on a combination of the divided APIs, HTTP communication will be executed any number of times, and, because lock will continue during that time, there is a problem in that the time of acquiring the lock (lock time) will increase. It is a known fact that a prolonged lock time is undesirable in the use of a database and, when attempting to shorten the lock time to resolve the foregoing problem, it is necessary to perform a series of processing within a single API. In other words, with the method disclosed in PTL 1, when attempting to shorten the lock time in the execution of the series of processing, the effect of reducing the burden on the DB server device in making modifications will be lost when applying the Web system to a different application destination.

The present invention was devised in view of the foregoing points, and an object of this invention is to propose a database server device, a server system and a request processing method capable of suppressing the prolongation of the lock time of the database upon the execution of a series of processing, and reducing the load of the implementation/modification of the database server device upon changing the application destination of the Web system.

Means to Solve the Problems

In order to achieve the foregoing object, the present invention provides the following database server device which performs operational processing of data to a database system. This database server device provides a prescribed simple API, and comprises: a request processing unit which receives a request using the simple API from a Web server device, and analyzes request data included in the received request and allocates processing; an SQL creation unit which generates an SQL sentence based on the request allocated by the request processing unit; and an SQL processing unit which creates a whole SQL sentence by performing predetermined processing to the SQL sentences generated by the SQL creation unit, and sends the created whole SQL sentence to the database system. Furthermore, with this database server device, when the request processing unit receives a plurality of divided requests from the Web server device as the request for requesting a series of processing, the SQL processing unit executes SQL integration processing of: temporarily storing the SQL sentences generated by the SQL creation unit based on each request of the plurality of requests until generation of the SQL sentences by the SQL creation unit is ended for all of the plurality of divided requests; and integrating and editing the plurality of temporarily stored SQL sentences and creating the whole SQL sentence after generation of the SQL sentences by the SQL creation unit is ended for all of the plurality of divided requests.

Moreover, in order to achieve the foregoing object, the present invention provides the following server system which performs operational processing of data to a database system. This server system comprises: a database server device which provides a prescribed simple API; and a Web server device which requests the database server device to execute operational processing of data to the database system according to a request from a Web client. Furthermore, the Web server device includes: a request creation unit which creates a request using the simple API provided by the database server device and sends the created request to the database server device, and the database server device includes: a request processing unit which receives the request from the Web server device, and analyzes request data included in the received request and allocates processing; an SQL creation unit which generates an SQL sentence based on the request allocated by the request processing unit; and an SQL processing unit which creates a whole SQL sentence by performing predetermined processing to the SQL sentences generated by the SQL creation unit, and sends the created whole SQL sentence to the database system. With this kind of server system, when execution of a series of processing is requested from the Web client: the request creation unit creates a request corresponding to the series of processing by dividing the request into a plurality of requests using the simple API, and sends the created request; and the SQL processing unit executes SQL integration processing of: temporarily storing the SQL sentences generated by the SQL creation unit based on each request of the plurality of requests until generation of the SQL sentences by the SQL creation unit is ended for all of the plurality of divided requests; and integrating and editing the plurality of temporarily stored SQL sentences and creating the whole SQL sentence after generation of the SQL sentences by the SQL creation unit is ended for all of the plurality of divided requests.

Moreover, in order to achieve the foregoing object, the present invention provides the following request processing method to be performed by a server system which performs operational processing of data to a database system. Here, the server system includes: a database server device which provides a prescribed simple API; and a Web server device which requests the database server device to execute operational processing of data to the database system according to a request from a Web client. Furthermore, this request processing method comprises: a request creation step of the Web server device creates a request using the simple API provided by the database server device and sending the created request to the database server device; a request processing step of the database server device receiving the request sent in the request creation step, and analyzing request data included in the received request and allocating processing; an SQL creation step of the database server device generating an SQL sentence based on the request allocated in the request processing step; and an SQL processing step of the database server device creating a whole SQL sentence by performing predetermined processing to the SQL sentences generated in the SQL creation step, and sending the created whole SQL sentence to the database system. With this kind of request processing method, when execution of a series of processing is requested from the Web client: in the request creation step, a request corresponding to the series of processing is created by dividing the request into a plurality of requests using the simple API, and the created request is sent; and in the SQL processing step, SQL integration processing of: temporarily storing the SQL sentences generated in the SQL creation step based on each request of the plurality of requests until generation of the SQL sentences in the SQL creation step is ended for all of the plurality of divided requests, and integrating and editing the plurality of temporarily stored SQL sentences and creating the whole SQL sentence after generation of the SQL sentence in the SQL creation step is ended for all of the plurality of divided requests, is executed.

Advantageous Effects of the Invention

According to the present invention, it is possible to suppress the prolongation of the lock time of the database upon the execution of a series of processing, and reduce the load of the implementation/modification of the database server device upon changing the application destination of the Web system.

BRIEF DESCRIPTION OF DRAWINGS

FIG. 4 is a diagram explaining a specific example of the JSON data that is generated as response data.

FIG. 7 is a diagram showing an example of a table included in the DBMS.

FIG. 9 is a diagram explaining a specific example of the SQL integration processing.

DESCRIPTION OF EMBODIMENTS

An embodiment of the present invention is now explained in detail with reference to the appended drawings. Note that, with a general Web system, there is a case where a Web server device and an application (AP) server device exist separately, and a case where a Web server device also assumes the role (has the function of) an AP server device. Nevertheless, because the present invention is not affected based on either configuration, the Web server device is explained as also assuming the role of the AP server device in order to simplify the following explanation.

Figure 1:
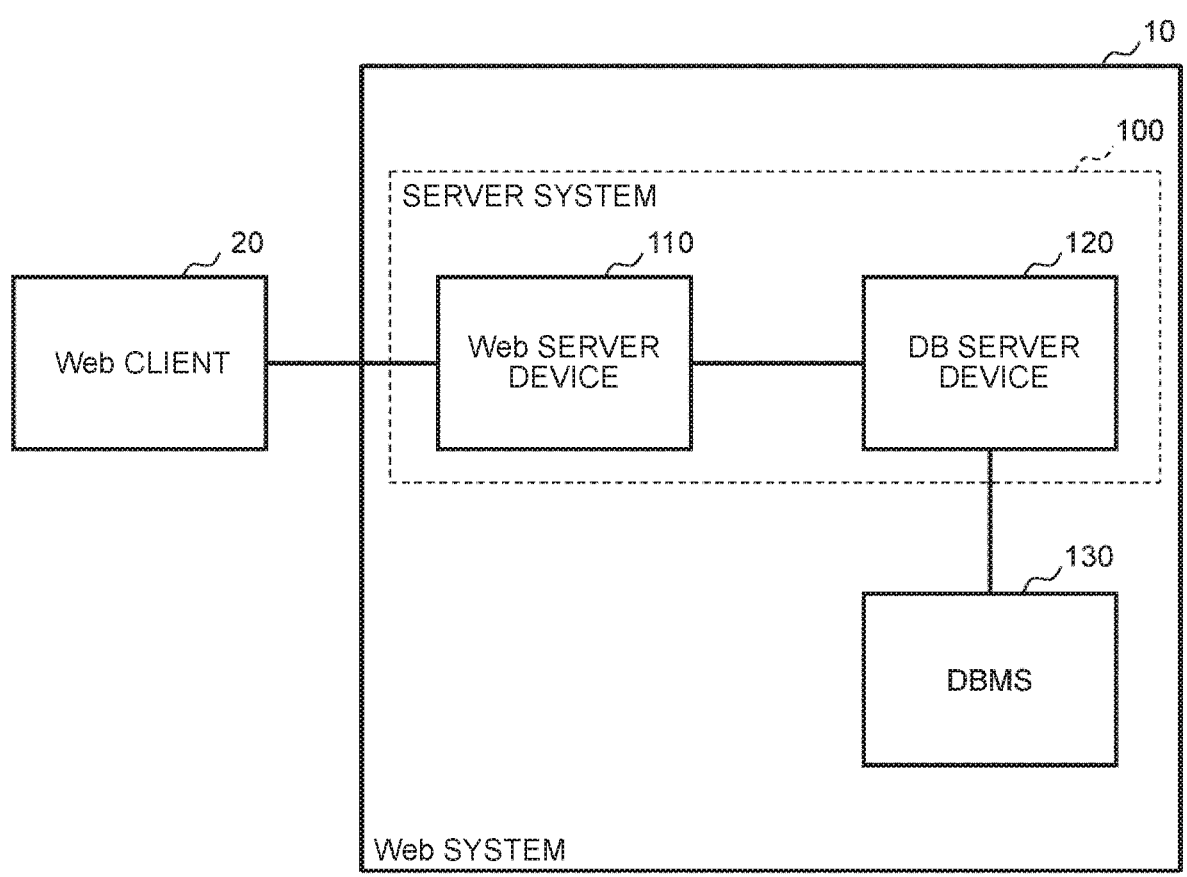
FIG. 1 is a block diagram showing an overall configuration example of the Web system including the server system according to an embodiment of the present invention.

FIG. 1 is a block diagram showing an overall configuration example of the Web system including the server system according to an embodiment of the present invention.

As shown in FIG. 1, a Web system 10 is configured by comprising a server system 100 according to this embodiment, and a DBMS 130, and the server system 100 comprises a Web server device 110 and a database (DB) server device 120. The Web server device 110 is connected to a Web client 20, and the DB server device 120 is connected to the database management system (DBMS) 130. Note that, in this embodiment, the DBMS 130 is a general DBMS on the assumption that it may be prepared by the user, and the Web system 10 serves as a platform that may be applied to a different application destination (case) by the configuration of the Web system 10 being modified.

The Web client 20 is a client that requests the Web system 10 to perform data processing to the database, and such request is input to the Web server device 110. The Web system 10 executes the processing described later in response to the request from the Web client 20, and returns the consequently obtained data from the Web server device 110 to the Web client 20.

In the server system 100, the DB server device 120 is an HTTP server, and the Web server device 110 is a server that performs communication via HTTP. The Web server device 110 and the DB server device 120 include a processor such as a CPU (Central Processing Unit), a main storage device such as a RAM (Random Access Memory), and an auxiliary storage device such as an HDD (Hard Disk Drive) or SSD (Solid State Drive).

The Web server device 110 is connected to the Web client 20 via an arbitrary network, and connected to the DB server device 120 via HTTP communication. In this embodiment, communication between the Web server device 110 and the DB server device 120 is performed, for example, with JSON (JavaScript (registered trademark) Object Notation) format data. While the details will be explained later, the Web server device 110 requests the DB server device 120, via HTTP communication, to execute the operational processing of data (data processing) to the DBMS 130 in response to the request from the Web client 20. The foregoing act of making the request is hereinafter referred to as a "request".

The DB server device 120 provides a relatively simple API. In this embodiment, a "simple API" is specifically, for example, an API that performs one processing among update, storage or acquisition to one data group. Note that, as a modified example of this embodiment, the "simple API" provided by the DB server device 120 is not necessarily limited to an API that performs one processing, and an API that performs few processing may be provided as a "simple API" to the extent that relatively simple implementation is possible.

The DB server device 120 configured from an HTTP server communicates with the Web server device 110 with an HTTP protocol, and sends and receives data using a versatile data format such as JSON on the HTTP protocol. Furthermore, the DB server device 120 generates an SQL sentence corresponding to the DBMS 130 to be used and requests the DBMS 130 to perform data processing based on the request received from the Web server device. Note that the DB server device 120 and the DBMS 130 are connected, for example, by using a JDBC (Java (registered trademark) DataBase Connectivity) library or the like.

The DBMS 130 operates and manages the database system. The DBMS 130 executes data processing using the data recorded in the database according to the SQL sentence received from the Web system 10 (DB server device 120), and returns the processing result to the Web system 10. In this embodiment, the DBMS 130 may be considered to be a general DBMS that is provided by various vendors on the assumption that it may be prepared by the user.

Note that, while a database system is generally separated into a database which stores data and a DBMS which manages the database in a strict sense, in the present invention, there is little logic in separating the configuration of the database system in detail. Thus, in the explanation of the present invention, the DBMS 130 is sometimes used synonymously with the database system. Specifically, for example, expressions such as "data stored in the DBMS 130" and "data of the DBMS 130" refer to the data stored in the database system (database). Moreover, for example, the expression of "making a change to the DBMS" refers to changing the data stored in the database system (database).

Moreover, while the DBMS 130 is illustrated as an independent device in FIG. 1, this embodiment is not limited thereto, and, for example, the DBMS 130 may also be provided within the same device as the DB server device 120.

As a result of the Web system 10 of this embodiment being configured by the DB server device 120 being provided between the Web server device 110 and the DBMS 130 as described above, the Web server device 110 (server system 100) can request the DBMS 130 to perform processing without having to give consideration to the configuration of the DBMS 130. Moreover, the foregoing configuration is also advantageous in comparison to the configuration of a Web server in which the Web server device is directly connected to the DBMS in that the Web server device does not need to be modified to accommodate a different DBMS.

The functional configuration of the server system 100 according to this embodiment is now explained in detail.

Figure 2:
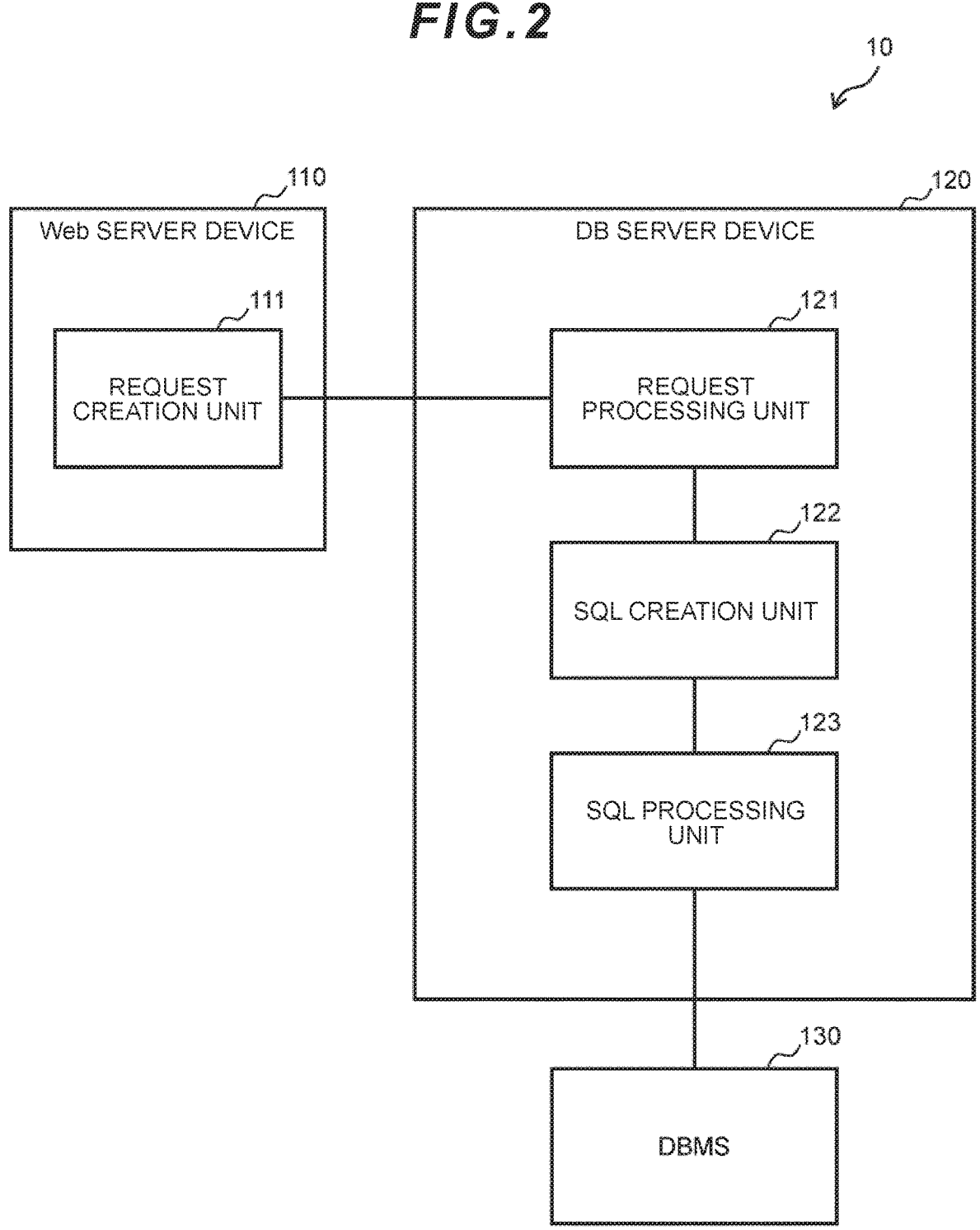
FIG. 2 is a block diagram showing a functional configuration example of the server system illustrated in FIG. 1.

FIG. 2 is a block diagram showing a functional configuration example of the server system illustrated in FIG. 1. As shown in FIG. 2, in the server system 100, the Web server device 110 includes a request creation unit 111, and the DB server device 120 includes a request processing unit 121, an SQL creation unit 122, and an SQL processing unit 123.

The request creation unit 111 of the Web server device 110 has a function of sending, via HTTP communication, a processing request to the DB server device 120 for performing processing to the DBMS 130 in response to the request from the Web client 20. Moreover, the request creation unit 111 has a function of using the dynamic parameter name included in the data received as a response from the DB server device 120, generating the next processing request for performing processing to the DBMS 130, and sending the generated processing request to the DB server device 120.

The request from the request creation unit 111 to the DB server device 120 is made as an HTTP request. In this HTTP request, data of a request ID and an end flag is delivered as the data. This data may be included as a part of the URL, or may be included as a part of the JSON data to be sent and received in the HTTP communication.

The request ID is an ID for identifying the series of processing related to the DBMS 130, and the same request ID is assigned to the series of processing. To put it differently, if it is a different request ID, it means that it is a different series of processing related to the DBMS 130. The request ID is used for identifying a plurality types of processing requests as the same group in the SQL processing unit 123 described later.

The end flag is configured from two identifiable values such as "true" or "false", and is information indicating whether an HTTP request is the last request of the series of processing related to the DBMS 130. Specifically, in a plurality of HTTP requests having the same request ID (that is, a plurality of HTTP requests indicating the series of processing), when the end flag is "false", it means that the HTTP request is not the last request of the series of processing, when the end flag is "true", it means that the HTTP request is the last request of the series of processing. The end flag is also used in the processing performed by the SQL processing unit 123 described later.

The request processing unit 121 of the DB server device 120 has a function of receiving, from the Web server device 110, a plurality types of processing requests to the DBMS 130 via the API provided by the DB server device 120, analyzing the request data included in each request, and allocating (assigning) the processing to the corresponding SQL creation unit 122. More specifically, the request processing unit 121 receives an HTTP request from the request creation unit 111 of the Web server device 110. As the methods of the HTTP request, there are GET, PUT, POST, and DELETE, and the request processing unit 121 assigns the processing of the HTTP request to the corresponding SQL creation unit 122 based on the HTTP method and URL.

Note that, because the foregoing processing performed by the request processing unit 121; that is, the processing of allocating the processing according to the HTTP method and URL, is processing that is generally used in a general Web server, the detailed explanation thereof is omitted.

The SQL creation unit 122 of the DB server device 120 has a function of generating an SQL sentence corresponding to the HTTP request assigned by the request processing unit 121, and sending the generated SQL sentence to the SQL processing unit 123. Moreover, the SQL creation unit 122 has a function of returning, to the request creation unit 111 of the Web server device 110, a response (HTTP response) including the result of the processing performed by the SQL processing unit 123. The request creation unit 111 that received the HTTP response processes the received data and then returns a response to the Web client 20. Note that the foregoing processing of returning a response to the Web client 20 may also be performed via the request processing unit 121, or may be independently performed by the SQL processing unit 123.

Because the foregoing processing performed by the SQL creation unit 122 is the processing of simply generating an SQL sentence corresponding to each HTTP request, and is processing that is generally used in a general Web server, the detailed explanation thereof is omitted. However, the following points regarding the processing of the SQL creation unit 122 will be additionally explained. When making variable the value of a conditional clause (WHERE clause) in the SQL sentence based on a values (fixed value such as the number or character string) included in the HTTP request during the generation of the SQL sentence corresponding to the HTTP request, this value (fixed parameter) may be included in the HTTP request by the Web server device 110. In this embodiment, let it be assumed that the SQL creation unit 122 delivers the fixed parameter to the SQL processing unit 123 without performing processing, and the SQL processing unit 123 processes the fixed parameter. Because the foregoing processing is also processing that is generally used, the detailed explanation thereof is omitted. In the following explanation, unless otherwise specified, the dynamic parameter and the fixed parameter will be simply indicated as "parameter" when there is no need to differentiate the two.

The SQL processing unit 123 of the DB server device 120, when classified broadly, has the following first to third SQL processing functions. The first SQL processing function is a function of concatenating or editing a plurality of SQL sentences generated within the DB server device 120 (SQL creation unit 122) in response to the request from the Web client 20, and sending the result to the DBMS 130. The second SQL processing function is a function of defining a dynamic parameter name, which is different from the fixed value such as the number or character string, in the data acquisition request from the DBMS 130, and returning the defined dynamic parameter name to the Web server device 110. The third SQL processing function is a function of editing the SQL sentence by associating the dynamic parameter name included in the SQL sentence generated by the SQL creation unit 122 in response to the request from the Web client 20, and the dynamic parameter name included in the processing request to the DBMS 130 received from the request creation unit 111 of the Web server device 110 via the API.

The SQL processing to be executed by the SQL processing unit 123 equipped with the foregoing first to third SQL processing functions is now explained in detail.

Figure 3:
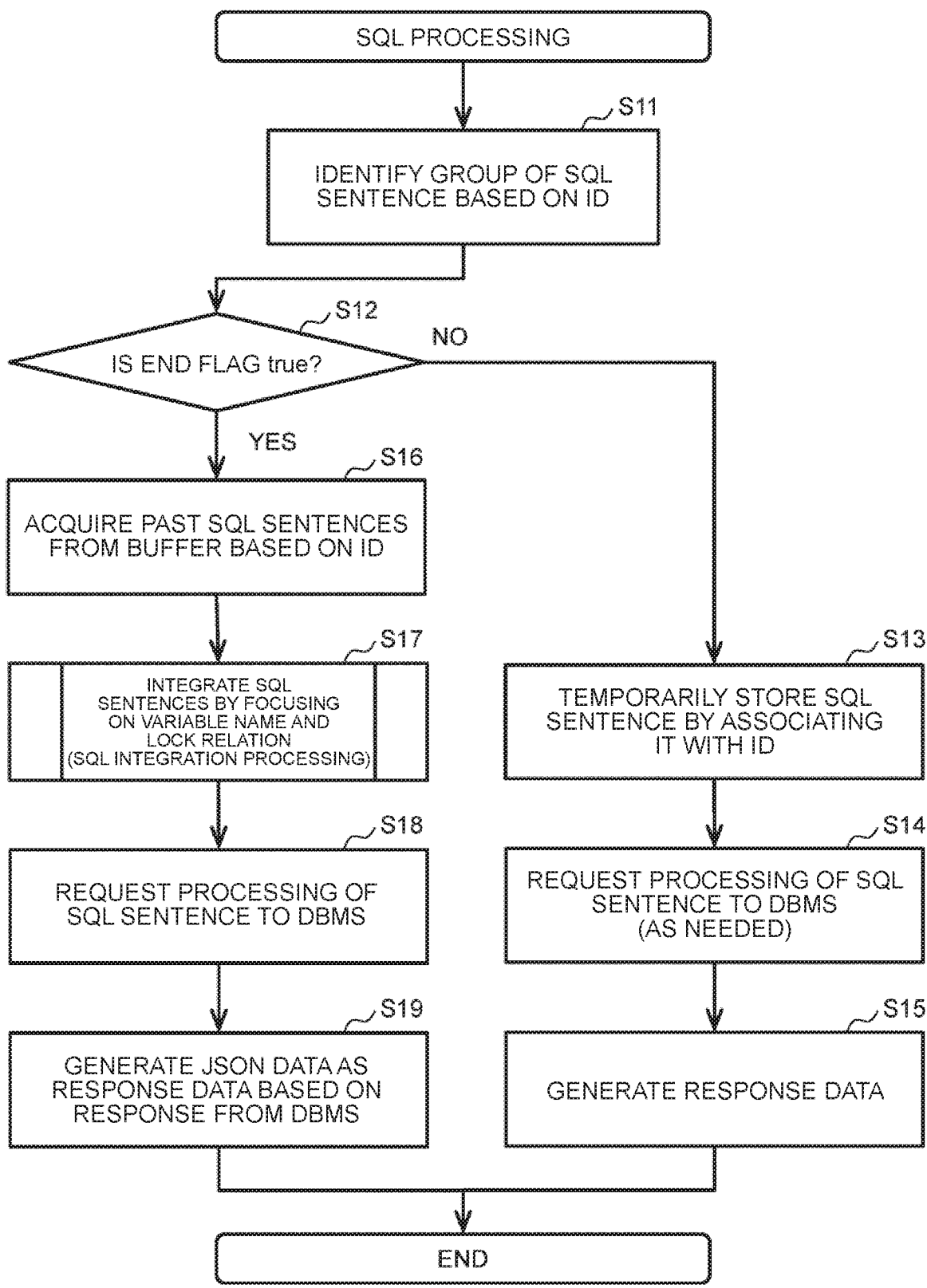
FIG. 3 is a flowchart showing a processing routine example of the SQL processing.

FIG. 3 is a flowchart showing a processing routine example of the SQL processing. The SQL processing unit 123 executes the SQL processing shown in FIG. 3 each time it receives an HTTP request and the SQL sentence generated by the SQL creation unit 122 in relation to that HTTP request.

According to FIG. 3, foremost, the SQL processing unit 123 identifies the group of the series of processing to which belongs the SQL sentence generated in relation to the HTTP request by confirming the request ID included in the received HTTP request (step S11). As described above, because the request ID is set to have the same value for the series of processing to be performed to the DBMS 130, the SQL processing unit 123 can determine whether the SQL sentence, which as been generated based on a previously received HTTP request, will be used in the current series of processing by identifying the group based on the request.

Next, the SQL processing unit 123 confirms the end flag included in the received HTTP request (step S12). When the end flag was not "true" in step S12; that is, when the end flag was "false" (step S12: NO), it means that the series of processing will not end with that HTTP request, and in such a case the processing proceeds to step S13. Meanwhile, when the end flag was "true" in step S12 (step S12: YES), it means that the series of processing will end with that HTTP request, and in such a case the processing proceeds to step S16 described later.

In step S13, the SQL processing unit 123 stores, in the internal buffer of the SQL processing unit 123, the SQL sentence generated by the SQL creation unit 122 in relation to the HTTP request, together with the request ID and the parameter information included in the HTTP request (by associating the SQL sentence with the request ID).

Subsequent to the processing of step S13, the SQL processing unit 123 may also execute the processing of applying the fixed parameter value included in the HTTP request to the SQL sentence generated in relation to the HTTP request, and sending the SQL sentence, to which the fixed parameter value was applied, to the DBMS 130 (step S14). The processing of step S14 is limited to the acquisition processing from the DBMS 130. To put it differently, the SQL processing unit 123 may execute the processing of step S14 by limiting it to processing that will not cause any change to the DBMS 130. Whether to execute the processing of step S14 may be determined by the SQL processing unit 123 to be implemented on a case-by-case basis, or, a flag for determining whether to execute the processing of step S14 may be separately added to the HTTP request, and the SQL processing unit 123 may determine whether to execute the processing of step S14 based on such flag. In any case, when the processing of step S14 is executed, the SQL processing unit 123 can acquire the data stored in the DBMS 130 as a reference without causing any change to the DBMS 130.

Subsequently, after the processing of step S13 or step S14, the SQL processing unit 123 generates response data to the HTTP request, sends the HTTP response including the generated response data to the Web server device 110 (step S15), and then ends the SQL processing.

The HTTP response to be returned in step S15 is now explained in detail. For example, in response to an HTTP request based on the PUT, POST, or DELETE method, the SQL processing unit 123 may return a response of "HTTP 200" which simply indicates that the HTTP request has been received, or, by adding JSON data as the response data, the SQL processing unit 123 may return a response indicating that the HTTP request has been properly received. However, with the HTTP communication in a general Web system, the return of the foregoing response means that the processing included in the HTTP request to be performed to the DBMS 130 will be completed. However, the Web system 10 of this embodiment differs in that, at the stage of returning the foregoing response in step S15, the DBMS 130 has not been changed in any way.

Meanwhile, in response to an HTTP request based on the GET method, the SQL processing unit 123 returns an HTTP response to the Web server device 110 in a format including the dynamic parameter name corresponding to each data to be acquired based on the HTTP request. FIG. 4 described later shows the JSON data as a specific example of the response data included in this kind of HTTP response. The SQL processing unit 123 sends the HTTP response including the generated JSON data to the Web server device 110, and then ends the SQL processing.

FIG. 4 is a diagram explaining a specific example of the JSON data that is generated as response data. The SQL sentence 210 shown in FIG. 4 is an example of the SQL sentence that is generated by the SQL creation unit 122 upon receiving an HTTP request based on the GET method. Furthermore, the JSON data 220 is an example of the JSON data that is generated by the SQL processing unit 123 based on the SQL sentence 210 in step S15 of FIG. 3.

The JSON data 220 is now explained in detail. As shown in FIG. 4, the JSON data 220 can be broadly classified into the two blocks of a "data" block and a "param" block.

Among the above, the data block describes a character string or an eigenvalue of a number. This kind of data block is the data that is returned from the DB server device 120 to the Web server device 110 when the HTTP request is to be independently processed by the DBMS 130. In other words, in the case of an independent request in which the end flag of the HTTP request is set to "true", such data block (specifically, "A", "1", etc.) is included as the response data to be included in the HTTP response.

Meanwhile, the param block describes the dynamic parameter name corresponding to each data item of the data block. Specifically, the param block describes the column name ("A", "B", etc.) to be included in the SELECT sentence of the SQL sentence 210, or another name of the column ("API_A_PARAM_A", etc.) designated based on AS in the SELECT sentence. Furthermore, in the case of an HTTP response to the HTTP request based on the GET method, a param block describing the foregoing dynamic parameter name will always be included in the JSON data that is generated as the response data. Furthermore, only in the case that the processing of step S14 is performed by the SQL processing unit 123, the data block will also be included in the generated JSON data. Note that the data block and the param block of the JSON data 220 shown in FIG. 4 are merely illustrative, and the actual format according to this embodiment is not limited to the above.

Returning to the explanation of the SQL processing of FIG. 3, as explained above, when the end flag was "true" in step S12 (step S12: YES), it means that the series of processing will end with the HTTP request, and the processing of steps S16 to S19 is executed.

Here, foremost, in step S16, the SQL processing unit 123 acquires, from the internal buffer, all SQL sentences and parameters included in the HTTP request, to which the same request ID as the corresponding HTTP request has been assigned, among the SQL sentences that were temporarily stored in the internal buffer in the processing of step S13 executed in the previous SQL processing.

Next, the SQL processing unit 123 integrates the plurality of SQL sentences acquired in step S16 by focusing on the variable name and lock-related processing (step S17). The processing of step S17 is referred to as the SQL integration processing, and the detailed processing routine thereof will be explained later with reference to FIG. 5.

Furthermore, the SQL processing unit 123 sends the SQL sentences integrated in the SQL integration processing of step S17 to the DBMS 130, and requests data processing (step S18). Subsequently, the SQL processing unit 123 generates the JSON data, which is the response data, based on the response of the data processing from the DBMS 130, sends the HTTP response including the generated response data to the Web server device 110 (step S19), and then ends the SQL processing.

Note that, unlike the case of step S15 described above, because the SQL processing regarding the series of processing indicated by the request ID of the HTTP request will be completed at the stage of step S19, the response data to be returned to the Web server device 110 in step S19 is the same as the response data of the series of processing in a general Web system.

Figure 5:
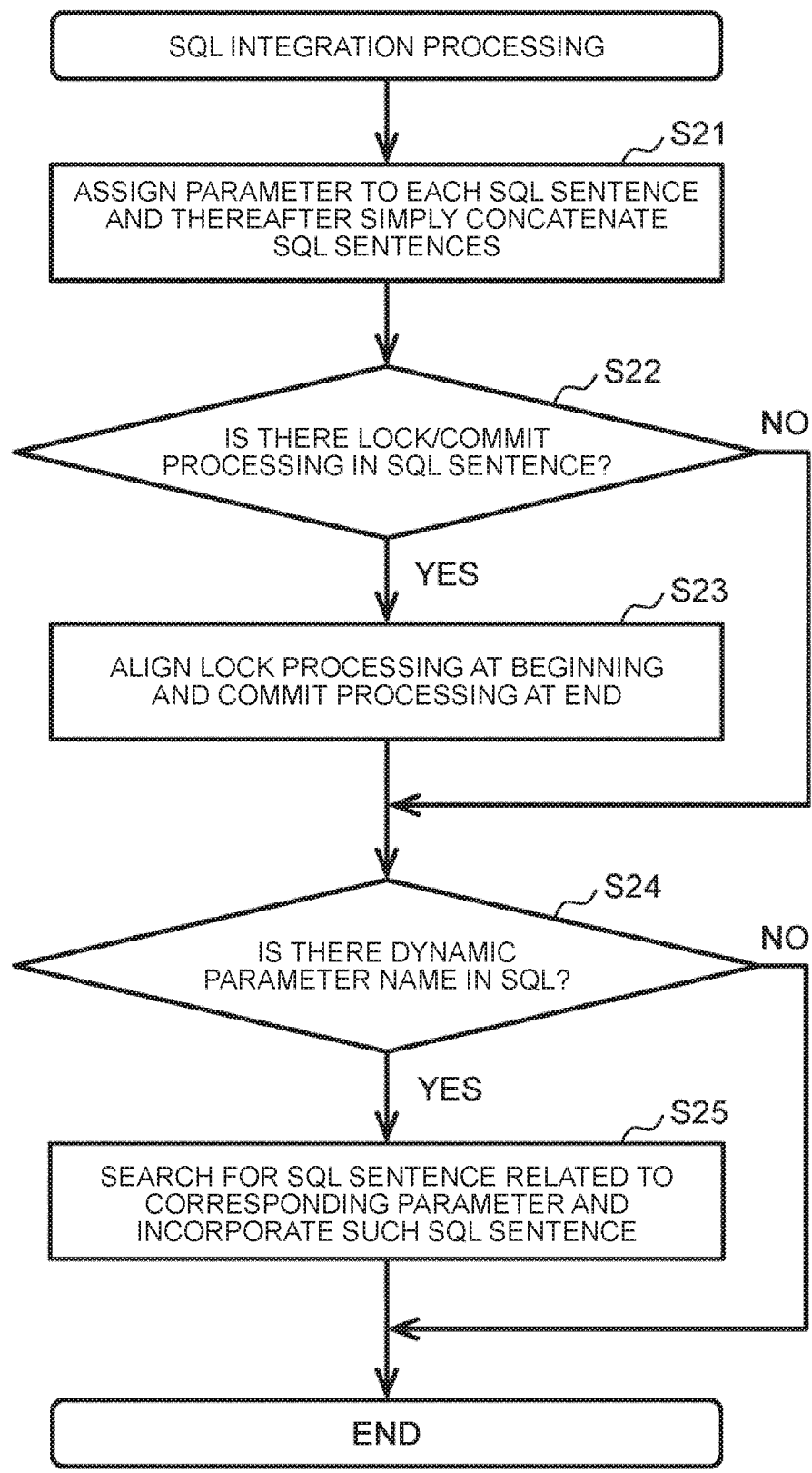
FIG. 5 is a flowchart showing a processing routine example of the SQL integration processing.

FIG. 5 is a flowchart showing a processing routine example of the SQL integration processing. The SQL integration processing shown in FIG. 5 corresponds to the processing of step S17 of FIG. 3, and is executed by the SQL processing unit 123.

According to FIG. 5, foremost, the SQL processing unit 123 substitutes a parameter included in the HTTP request in a plurality of SQL sentences acquired in step S16 of FIG. 3, and thereafter simply concatenates the SQL sentences based on a time series (step S21). In the following explanation, the SQL sentences concatenated in step S21 are hereinafter referred to as a whole SQL sentence.

Next, the SQL processing unit 123 confirms whether specific processing (for example, lock processing or commit processing) exists in the whole SQL sentence concatenated in step S21 (step S22), proceeds to step S23 when the foregoing specific processing exists (step S22: YES), and skips step S23 and proceeds to step S24 when the foregoing specific processing does not exist (step S22: NO).

In step S23, the SQL processing unit 123 aligns the SQL sentences related to the foregoing specific processing included in the whole SQL sentence by switching the order of the SQL sentences. Specifically, the SQL processing unit 123 moves the sentence related to lock processing to the beginning of the whole SQL sentence, and moves the sentence related to commit processing to the end of the whole SQL sentence. As a result of being aligned in step S23, the whole SQL sentence becomes the SQL sentence to perform the lock and commit processing across the overall series of processing.

When the determination is NO after the processing of step S23 or in step S22, the SQL processing unit 123 determines whether a dynamic parameter name is included in the HTTP request (step S24). When a dynamic parameter name is not included in step S24 (step S24: NO), the SQL processing unit 123 ends the SQL integration processing. Note that, if the parameter included in the HTTP request is a fixed parameter, the SQL processing unit 123 applies such parameter to the whole SQL sentence.

Meanwhile, when a dynamic parameter name is included in the HTTP request in step S24 (step S24: YES), the SQL processing unit 123 searches for a SELECT-related SQL sentence related to the data acquisition of the dynamic parameter from the whole SQL sentence, and incorporates the corresponding SQL sentence into the part where the foregoing dynamic parameter name is being used (step S25). Note that, while a SELECT sentence for acquiring a plurality of values may exist in certain SQL sentences, in such a case, the SQL processing unit 123 modifies the SELECT sentence so that only the value of the dynamic parameter name is acquired. After the processing of step S25, the SQL processing unit 123 ends the SQL integration processing.

As explained above, with the Web system 10 including the server system 100 according to this embodiment, in response to the request from the Web client 20, the Web server device 110 can use the simple API provided by the DB server device 120 and divide the request of the series of processing to be performed to the DBMS 130 into a plurality types of processing requests and thereby make the request to the DB server device 120. Subsequently, as a result of the DB server device 120 integrating the SQL sentences generated based on the plurality of divided processing requests that were delivered and then requesting the DBMS 130 to perform data processing, even if the request of the series of processing is the execution of lock processing or commit processing across the overall processing, it is possible to appropriately request the corresponding data processing to the DBMS 130.

Figure 6:
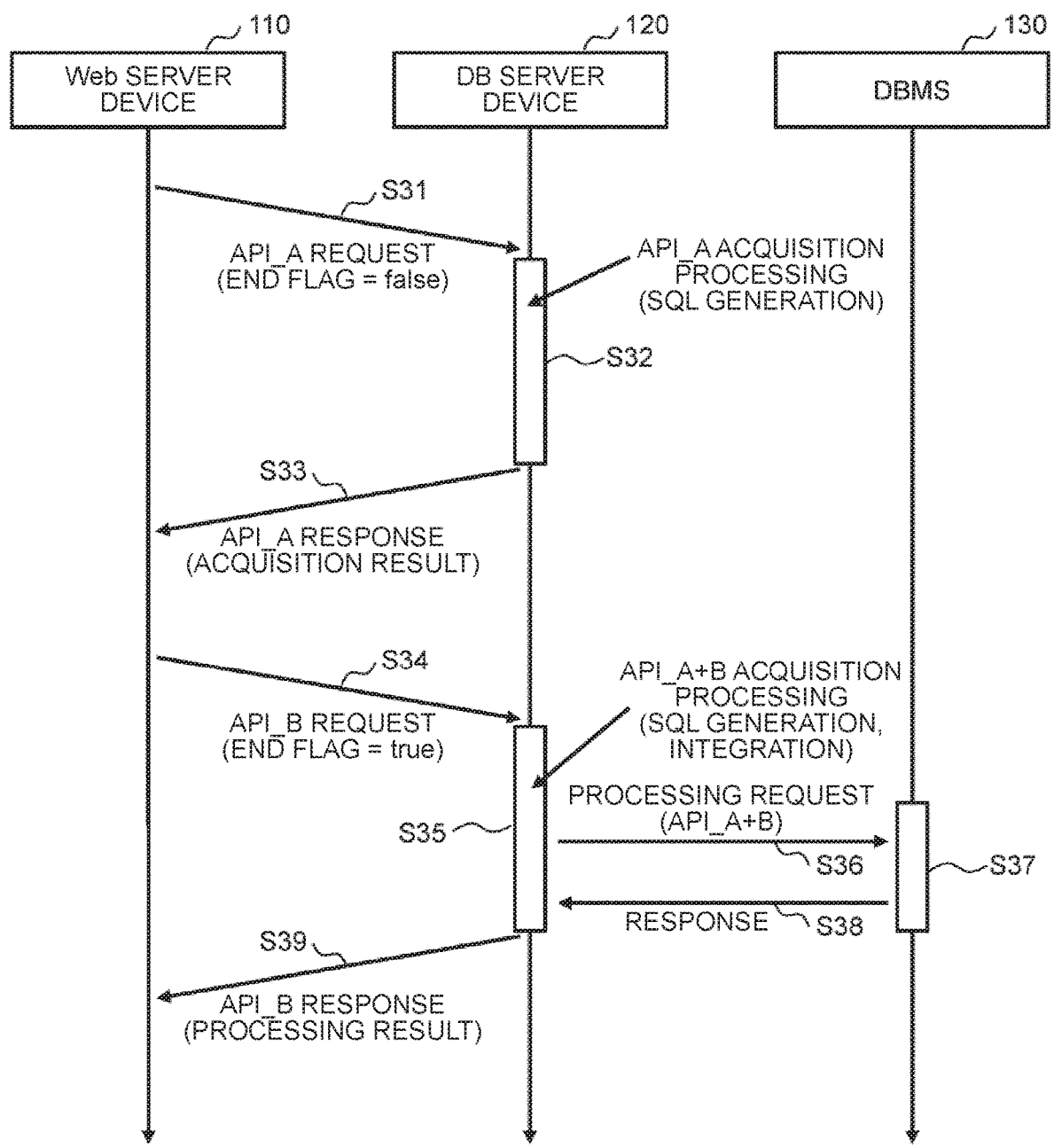
FIG. 6 is a sequence diagram showing the flow of a series of processing performed in the Web system.

FIG. 6 is a sequence diagram showing the flow of a series of processing performed in the Web system 10. To avoid any redundant explanation, the detailed explanation of the individual processing of FIG. 6 will be omitted, and only the processing to be performed by the DB server device 120 is shown. In FIG. 6, the processing (steps S32 to S33) to be executed by the DB server device 120 upon receiving the HTTP request (API_A request, end flag is false) of step S31 from the Web server device 110 corresponds to the processing of steps S11 to S15 of the SQL processing of FIG. 3. Moreover, in FIG. 6, the processing (step S35 to S36) to be executed by the DB server device 120 upon receiving the HTTP request (API_B request, end flag is true) of step S34 from the Web server device 110 corresponds to the processing of steps S11 to S12 and S16 to S19 of the SQL processing of FIG. 3. The processing shown in FIG. 6 is performed. Here, in particular, as a result of making the processing request to the DBMS 130 by using the whole SQL sentence that underwent the SQL integration processing in step S35, a plurality types of processing (API_A and API B) based on a plurality of HTTP requests can be executed across the series of processing.

The Web system 10 configured by including the server system 100 according to this embodiment explained above is particularly effective in a system in which the level of modification of the Web server device 110 is considerable upon being applied to a different case using a developed platform, and a system in which the main objective of the DB server device 120 is data storage. As a specific example of such particularly effective system, considered may be a KPI (Key Performance Indicator) computing system or a simulation system. Because these systems mainly involve complex calculations, calculation is generally performed by the Web server device 110 rather than by the DB server device 120. Moreover, with these systems, generally speaking, the Web server device 110 is installed in a greater size in comparison to the DB server device 120, and the functions demanded by the DB server device 120 tend to be relatively simple.

In the following explanation, as an example of the usage of this kind of system, an example of the Web system 10 of this embodiment will be explained with reference to the specific example shown in FIG. 7 to FIG. 9.

FIG. 7 is a diagram showing an example of a table included in the DBMS. In the table 230 illustrated in FIG. 7, line 231 indicates the name of each column, and each line of line 232 onward indicates the value corresponding to each column of the table 230. In this example, as an example of a "series of processing", a specific processing routine is explained regarding a case of copying the value of line 232 of the table 230 to another line, and additionally changing the value of certain columns.

Figure 8:
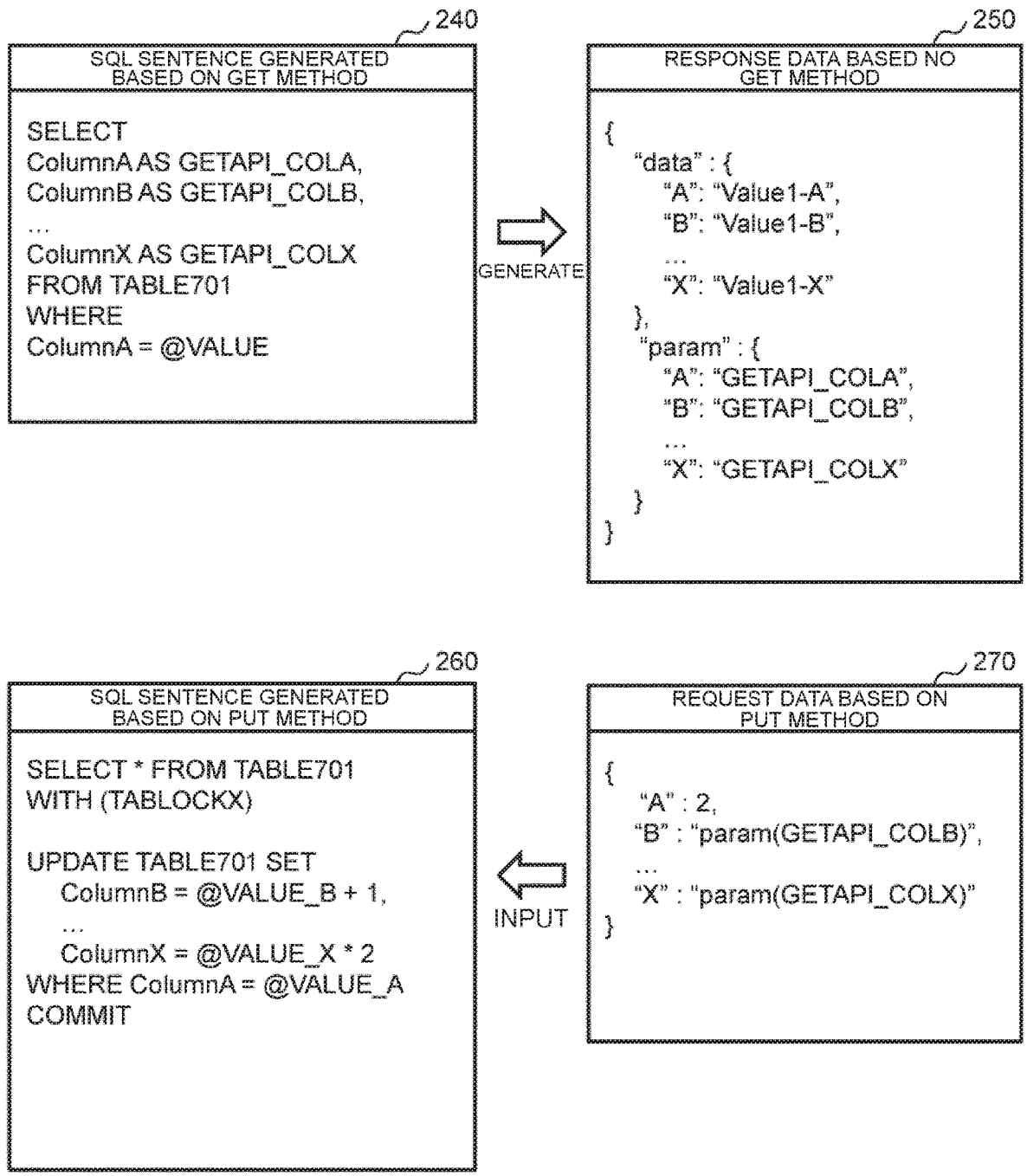
FIG. 8 is a diagram showing specific examples of the SQL sentence and the JSON data related to the API.

FIG. 8 is a diagram showing specific examples of the SQL sentence and the JSON data related to the API. FIG. 8 shows the SQL sentences 240, 260 generated pursuant to the HTTP requests to the DB server device 120, and the JSON data 250, 270 that are input or output associated with the HTTP requests. While the details will be explained later, the SQL sentence 240 is a specific example of the SQL sentence that is generated in response to the HTTP request based on the GET method, and the SQL sentence 260 is a specific example of the SQL sentence that is generated in response to the HTTP request based on the PUT method.

The processing to be performed to the DBMS 130 according to the "series of processing" in this example can be divided into the processing of acquiring the value of line 232 of the table 230, and the processing of updating the value of a specific line of the table 230, and they can each be defined in the form of an HTTP request based on the GET method and an HTTP request based on the PUT method.

Thus, foremost, the request creation unit 111 of the Web server device 110 sends, to the DB server device 120, an HTTP request based on the GET method in which the request ID is 100 and the end flag is false. Here, in order to enable the recognition of line 232 of the table 230 in the foregoing HTTP request, the value of "1" of "Column A" is also sent as a fixed parameter to the DB server device 120. Note that, because the Web server device 110 is aware of the contents of the series of processing, it can properly set the request ID and the end flag.

Next, in the DB server device 120, when the HTTP request from the request creation unit 111 is received and the request processing unit 121 allocates the processing, the SQL creation unit 122 generates a SQL sentence (SQL sentence 240 of FIG. 8), but since general processing can be diverted to such processing, the detailed explanation thereof is omitted.

Next, the SQL processing unit 123 executes the SQL processing shown in FIG. 3 to the SQL sentence 240. Foremost, in step S11, the SQL processing unit 123 comprehends that the SQL sentence 240 is an SQL sentence in which the request ID is 100, and, in step S12, confirms that the end flag is false (not true). Because the end flag is false, in step S13, the SQL processing unit 123 stores the SQL sentence 240, the request ID and the parameter in the internal buffer.

Furthermore, in step S14, the SQL processing unit 123 sets the fixed parameter, which was delivered with the HTTP request, at the part of "@VALUE" in the SQL sentence 240, and requests the processing to the DBMS 130. This is because the SQL sentence 240 generated based on the GET method satisfies the condition of "limited to the acquisition processing from the DBMS 130" related to the execution of step S14 described above with reference to FIG. 3.

The SQL processing unit 123 thereafter generates the JSON data 250, as the processing of step S15, based on the response from the DBMS 130 and the SQL sentence 240. As shown in FIG. 8, the JSON data 250 is of a format including a data block and a param block, and the reason why the data block is included is because the processing of step S14 was performed. Meanwhile, the param block describes, as the dynamic parameter name, another name of each column name ("GETAPI_COLA" or "GETAPI_COLB") indicated using "AS" in relation to each column name ("Column A" or "Column B") in the SQL sentence 240. Subsequently, the SQL processing unit 123 returns the JSON data 250, as the HTTP response, to the Web server device 110 (request creation unit 111). While this response is an HTTP response based on the GET method, at this stage the DBMS 130 has not been changed.

Next, the request creation unit 111 of the Web server device 110 receives the HTTP response based on the GET method, and sends, to the DB server device 120, an HTTP request based on the PUT method in which the request ID is also 100 and the end flag is true. Here, the request creation unit 111 generates the JSON data 270 pursuant to the previous HTTP response based on the GET method, and sends the JSON data 270, by including it in the HTTP request, to the DB server device 120. Here, "param ( )" is assigned to the parameter that is designated as the dynamic parameter name in order to specify that it is a dynamic parameter name. Note that, as a derivative example of the present invention, rather than just generating the dynamic parameter, for example, it is also possible to adopt a method of generating the JSON data 270 by designating the MAX ( ) function with the dynamic parameter as the argument, and designating the maximum value by using the MAX ( ) function in the SELECT sentence described later, or adopt a method which is expressed as a mathematical formula of a four arithmetic operation including the dynamic parameter.

Next, in the DB server device 120, the HTTP request is received from the request creation unit 111 and processing is allocated by the request processing unit 121, and the SQL sentence 260 is generated by the SQL creation unit 122 and delivered to the SQL processing unit 123. Here, "@VALUE_B", "@VALUE_X", and "@VALUE_A" of the SQL sentence 260 shown in FIG. 8 mean the setting of parameters of the corresponding alphabets (B, X, A) included in the JSON data 270.

Next, the SQL processing unit 123 executes the SQL processing shown in FIG. 3 to the SQL sentence 260. Specifically, in step S11, the SQL processing unit 123 comprehends that the SQL sentence 260 is an SQL sentence linked with the request ID of "100", and, in step S12, confirms that the end flag is true. Because the end flag is true, in step S16, the SQL processing unit 123 acquires, from the internal buffer, the SQL sentence 230 and its related parameter with the same request ID "100" as the key. Subsequently, in step S17, the SQL processing unit 123 integrates the SQL sentence 240 and the SQL sentence 260. The specific routine of the SQL integration processing will be explained later with reference to FIG. 9.

Furthermore, in step S18, the SQL processing unit 123 sends the SQL sentence which was integrated in step S17 to the DBMS 130, and requests data processing. Subsequently, in step S19, the SQL processing unit 123 creates an HTTP response and returns the created HTTP response to the Web server device 110 (request creation unit 111) based on the response from the DBMS 130. This response is an HTTP response to the request of the series of processing to which the request ID "100" was assigned, and the data of the DBMS 130 is changed according to the request of the series of processing. However, the foregoing response may also have a separate meaning as the HTTP response based on the PUT method.

FIG. 9 is a diagram explaining a specific example of the SQL integration processing. FIG. 9 shows the SQL sentence 280 that is currently being integrated, and the SQL sentence 290 after the integration, when the SQL processing unit 123 executes the SQL integration processing (refer to FIG. 5) to the SQL sentence 240 and the SQL sentence 260 shown in FIG. 8.

In the SQL integration processing, foremost, in step S21, the SQL processing unit 123 substitutes the parameter included in the HTTP request into the SQL sentence 240 and the SQL sentence 260, and further simply concatenates these SQL sentences based on a time series. Here, "param ( )" is assigned to the parameter that is designated as the dynamic parameter name in order to specify that it is a dynamic parameter name. The SQL sentence 280 is generated as a result of the foregoing processing.

Specifically, upon referring to FIG. 9, a first half part 281 of the SQL sentence 280 indicates a SQL sentence based on the SQL sentence 240 generated based on the GET method, and "1", which was sent as the fixed parameter of "Column A", is substituted in the parameter of "@VALUE". Moreover, a second half part 282 indicates a SQL sentence based on the SQL sentence 260 generated based on the PUT method. Furthermore, in the second half part 282, the fixed parameter of "2" is substituted in the parameter of "@VALUE_A" by referring to the JSON data 270 on the one hand, and "param (GETAPI_COLB)" and "param (GETAPI_COLX)" using the dynamic parameter name are assigned to the parameters such as "@VALUE_B" and "@VALUE_X" by referring to the JSON data 270.

Next, the SQL processing unit 123 executes the processing of steps S22 to S25 to the SQL sentence 280. Specifically, because the sentence which begins with "SELECT*" in the SQL sentence 280 is a sentence for lock acquisition, it is moved to the beginning of the SQL sentence 280. Moreover, because the "COMMIT" sentence already exists only at the end of the SQL sentence 280, it is maintained at the same position without being moved. Furthermore, the SQL processing unit 123 searches for the SQL sentence for acquiring the dynamic parameter from the SQL sentence 280 regarding the dynamic parameter in "param ( )" included in the second half part 282 of the SQL sentence 280, and edits the SQL sentence and replaces the part of param ( ) so that only the foregoing dynamic parameter is acquired for that SQL sentence; that is, so that other parameters are not acquired. The SQL sentence 290 is generated as a result of the foregoing processing.

Subsequently, as explained in step S18 of FIG. 5, the SQL processing unit 123 can properly execute the lock and commit processing across a plurality of APIs by sending the post-integration SQL sentence 290 to the DBMS 130 and requesting data processing.

Note that, while the foregoing example explained a case by taking a single table 230 as an example, this embodiment can similarly be realized even in cases of including processing to be performed to a plurality of tables. For example, when acquiring or updating values of a plurality of tables, by respectively preparing the GET method and PUT method, or the POST method, for each table and executing the same processing as those explained above, the lock and commit processing can also be normally executed to a plurality of tables.

Moreover, in the foregoing example, when acquiring only the value of a specific table (for example, table A) and copying that value to another table (for example, table B), table A will not be locked. Meanwhile, when the locking of table A needs to be secured, an API of the version for acquiring a lock of table A as the acquisition source of the value should be prepared separately from the API of the version that does not acquire the lock of table A of the acquisition source of the value in the GET method. It should be easy to understand from the previous explanation that table A can also be locked as a result of providing the API of a plurality of versions.

As explained above, according to the server system 100 of this embodiment, as a result of the DB server device 120 providing a simple API and the Web server device 110 using a request ID and an end flag and combining and using the foregoing simple API, it is possible to control the processing to be performed by the DB server device 120 and request the intended processing to the DBMS 130 via the DB server device 120.

In other words, the DB server device 120 according to this embodiment can handle a request of relatively complex processing (specifically, processing of lock or commit across the series of processing) from the Web server device 110 to the DBMS 130 while simplifying the functions to be provided to the Web server device 110, and the lock time of the DBMS 130 (database) during the execution of the series of processing can be suppressed to be the minimum time required without being excessively prolonged.

Furthermore, because the DB server device 120 according to this embodiment can implemented only with relatively simple functions (no need to implement a function capable of providing a complex API), the mounting size of the DB server device 120 can be kept small in comparison a DB server device used in a conventional Web system.

Furthermore, according to this kind of DB server device 120, because the functions to be implemented can be simplified, when applying the Web system 10 to a different case, minimization of modification of the features implemented in the DB server device 120 can be expected, and the application of the Web system 10 to a different case can be realized mainly based on the modification of the Web server device 110.

To put it differently, according to the DB server device 120 of this embodiment, it is possible to reduce the load of the DB server device 120 in the Web system 10 (or server system 100), and the accommodation to various types of DBMS 130 by the Web system 10 and the application of the Web system 10 to a difference case can be mainly dealt with based on the modification of the Web server device 110.

Meanwhile, with the server system 100 according to this embodiment, because the Web server device 110 can combine the simple API provided from the DB server device 120 and request the DB server device 120 to perform the series of processing to the DBMS 130 unlike with a conventional Web server device which requested the series of processing to be performed to the DBMS based on one HTTP request including a plurality of APIs, the modification required in the Web server device 110 upon applying the Web system 10 to a different case will be smaller in comparison to the modification required in the foregoing conventional Web server device, and reduction in the modification difficulty can be expected. In other words, it is possible to exhibit the effect of suppressing the modification level and modification difficulty in the overall server system 100 (or Web system 10).

Moreover, with the server system 100 according to this embodiment, because the Web server device 110 can control the detailed processing to be performed to the DBMS 130, it is possible to reduce the approximation of the specification of processing between the Web server device 110 and the DB server device 120.

Note that the present invention is not limited to the embodiment and examples described above, and may include various modified examples. For example, the foregoing embodiment and examples were explained in detail for explaining the present invention in an easy-to-understand manner, and the present invention does not need to necessarily comprise all of the configurations explained in the foregoing embodiment. For example, another configuration may be added to, deleted from or replaced with a part of the configuration of the foregoing embodiment.

Moreover, a part or all of the respective configurations, functions, processing units, and processing means described above may be realized with hardware such as by designing an integrated circuit. Moreover, each of the foregoing configurations and functions may also be realized with software by a processor interpreting programs for realizing the respective functions and executing such programs. Information such as programs, tables and files that realize the respective function may be stored in a memory, a recording device such as a hard disk or SSD, or a recording medium such as an IC card, SD card, or DVD.

Moreover, in the appended drawings, control lines and information lines are illustrated to the extent required for the explanation, and not all control lines and information lines required for the product are not necessarily illustrated. In effect, it should be understood that all configurations are mutually connected.

REFERENCE SIGNS LIST

10 Web system
20 Web client
100 server system
110 Web server device
111 request creation unit
120 database (DB) server device
121 request processing unit
122 SQL creation unit
123 SQL processing unit
130 database management system (DBMS)
210, 240, 260, 280, 290 SQL sentence
220, 250, 270 JSON data
230 table

The invention claimed is:

1. A database server device which performs operational processing of data to a database system, wherein the database server device provides a prescribed simple API, and comprises:
   a processor;
   a memory coupled to the processor, the memory storing instructions that when executed, configure the processor to:

receive a request using the simple API from a Web server device, and analyze request data included in the received request and allocate processing;
generate an SQL sentence based on the request allocated by the request processing unit; and
create a whole SQL sentence by performing predetermined processing to the generated SQL sentences, and send the created whole SQL sentence to the database system,
wherein, upon receiving a plurality of divided requests from the Web server device as the request for requesting a series of processing,
execute SQL integration processing of:
temporarily storing the generated SQL sentences based on each request of the plurality of divided requests until generation of the SQL sentences is ended for all of the plurality of divided requests; and
integrating and editing the plurality of temporarily stored SQL sentences and creating the whole SQL sentence after generation of the generated SQL sentences is ended for all of the plurality of divided requests,
wherein the request is an HTTP request,
wherein the request data included in the HTTP request received from the Web server device includes a request ID,
wherein each of the plurality of divided requests of the series of processing have a same request ID,
wherein the HTTP request further includes a parameter name, and an end flag indicating whether the request is a last request of the series of processing,
wherein the SQL processing unit executes the SQL integration processing when the end flap included in the request corresponding to the SQL sentence generated by the SQL creation unit indicates that the request is a last request of the series of processing, and
wherein the SQL integration processing includes integration processing of integrating, among the plurality of temporarily stored SQL sentences, all of the SQL sentences generated based on the requests, in which the value of the request ID is the same, into the whole SQL sentence and associates the whole SQL sentence with the request ID.

2. The database server device according to claim 1, wherein the SQL integration processing includes edit processing of determining a correspondence of the SQL sentence and the parameter name included in the request, and editing each of the SQL sentences or the integrated whole SQL sentence based on the determination result.

3. The database server device according to claim 2, wherein the SQL processing unit, in the edit processing of the SQL integration processing, aligns an order of the SQL sentences related to specific processing according to predetermined rules within the whole SQL sentence that underwent the integration processing.

4. The database server device according to claim 3, wherein the SQL processing unit, in the edit processing of the SQL integration processing, moves an SQL sentence related to lock processing to the beginning and moves an SQL sentence related to commit processing to the end within the whole SQL sentence that underwent the integration processing.

5. The database server device according to claim 2, wherein the SQL processing unit, in the edit processing of the SQL integration processing, substitutes a fixed parameter of the SQL sentence with a parameter value and, for the SQL sentence using a dynamic parameter, edits the SQL sentence or the whole SQL sentence so that only the dynamic parameter is acquired based on the determination result of the correspondence of the SQL sentence and the parameter name.

6. The database server device according to claim 1, wherein the SQL processing unit, in the integration processing of the SQL integration processing, concatenates all of the SQL sentences to be integrated into the whole SQL sentence based on a time series.

7. The database server device according to claim 1, wherein, when the request processing unit receives the plurality of divided requests from the Web server device as the request for requesting a series of processing,
the SQL processing unit does not perform the operational processing of changing the data stored in the database system while the whole SQL sentence is being created based on the SQL integration processing.

8. The database server device according to claim 1, wherein the database server device provides, as the simple API, an API of performing one processing among update, storage or acquisition to one data group stored in the database system.

9. A server system which performs operational processing of data to a database system, comprising:
a database server device which provides a prescribed simple API; and
a Web server device which requests the database server device to execute operational processing of data to the database system according to a request from a Web client,
wherein the Web server device includes:
a processor; and
a memory coupled to the processor, the memory storing instructions that when executed, configure the processor to create a request using the simple API provided by the database server device and sends the created request to the database server device,
wherein the database server device includes:
a processor;
a memory coupled to the processor, the memory storing instructions that when executed, configure the processor to:
receive a request from the Web server device, and analyze request data included in the received request and allocate processing;
generate an SQL sentence based on the request allocated by the request processing unit; and
create a whole SQL sentence by performing predetermined processing to the SQL sentences generated by the SQL creation unit, and send the created whole SQL sentence to the database system,
wherein, upon execution of a series of processing is requested from the Web client:
the processor of the database server is configured to create a request corresponding to the series of processing by dividing the request into a plurality of requests using the simple API, and send the created request; and
execute SQL integration processing of:
temporarily storing the generated SQL sentences based on each request of the plurality of divided requests until generation of the SQL sentences is ended for all of the plurality of divided requests; and
integrating and editing the plurality of temporarily stored SQL sentences and creating the whole SQL sentence after generation of the SQL sentences by the generated is ended for all of the plurality of divided requests wherein the request is an HTTP request,
wherein the request data included in the HTTP request received from the Web server device includes a request ID,
wherein each of the plurality of divided requests of the series of processing have a same request ID,
wherein the HTTP request further includes a parameter name, and an end flag indicating whether the request is a last request of the series of processing,
wherein the SQL processing unit executes the SQL integration processing when the end flag included in the request corresponding to the SQL sentence generated by the SQL creation unit indicates that the request is a last request of the series of processing, and
wherein the SQL integration processing includes integration processing of integrating, among the plurality of temporarily stored SQL sentences, all of the SQL sentences generated based on the requests, in which the value of the request ID is the same, into the whole SQL sentence and associates the whole SQL sentence with the request ID.

10. The server system according to claim 9,
wherein the SQL integration processing includes edit processing of determining a correspondence of the SQL sentence and the parameter name included in the request, and editing each of the SQL sentences or the integrated whole SQL sentence based on the determination result.

11. The server system according to claim 10,
wherein the SQL processing unit, in the edit processing of the SQL integration processing, aligns an order of the SQL sentences related to specific processing according to predetermined rules within the whole SQL sentence that underwent the integration processing.

12. A request processing method to be performed by a server system which performs operational processing of data to a database system,
wherein the server system includes:
a database server device which provides a prescribed simple API; and
a Web server device which requests the database server device to execute operational processing of data to the database system according to a request from a Web client,
wherein the request processing method comprises:
a request creation step of the Web server device creates a request using the simple API provided by the database server device and sending the created request to the database server device;
a request processing step of the database server device receiving the request sent in the request creation step, and analyzing request data included in the received request and allocating processing;
an SQL creation step of the database server device generating an SQL sentence based on the request allocated in the request processing step; and
an SQL processing step of the database server device creating a whole SQL sentence by performing predetermined processing to the SQL sentences generated in the SQL creation step, and sending the created whole SQL sentence to the database system,
wherein, when execution of a series of processing is requested from the Web client:
in the request creation step, a request corresponding to the series of processing is created by dividing the request into a plurality of requests using the simple API, and the created request is sent; and
in the SQL processing step, SQL integration processing of:
temporarily storing the SQL sentences generated in the SQL creation step based on each request of the plurality of divided requests until generation of the SQL sentences in the SQL creation step is ended for all of the plurality of divided requests, and integrating and editing the plurality of temporarily stored SQL sentences and creating the whole SQL sentence after generation of the SQL sentence in the SQL creation step is ended for all of the plurality of divided requests, is executed,
wherein, upon creating the request, the request creation unit includes, in the request data to be included in the request, a request ID in which a same value is assigned for each request which requests the series of processing, a parameter name, and an end flag indicating whether the request is a last request of the series of processing,
wherein the SQL processing unit executes the SQL integration processing when the end flag included in the request corresponding to the SQL sentence generated by the SQL creation unit indicates that the request is a last request of the series of processing, and
wherein the SQL integration processing includes integration processing of integrating, among the plurality of temporarily stored SQL sentences, all of the SQL sentences generated based on the requests, in which the value of the request ID is the same, into the whole SQL sentence.

* * * * *